United States Patent [19]

Blickle et al.

[11] 4,256,576
[45] Mar. 17, 1981

[54] PROCESS FOR SEGREGATING SOLID SUBSTANCES FROM A LIQUID PHASE

[75] Inventors: Tibor Blickle, Budapest; Zsigmond Komaromy, Veszprém; Judit Filka, Veszprem; Janos Gyenis, Veszprém; Oszkar Borlai, Budapest, all of Hungary

[73] Assignee: Magyar Tudományos Akadémia Müszaki Kémiai Kutató Intézet, Veszprém, Hungary

[21] Appl. No.: 456,254

[22] Filed: Mar. 29, 1974

[51] Int. Cl.³ .................... B01D 17/00; F28D 11/06; F28G 7/00
[52] U.S. Cl. .................................... 62/538; 62/70; 62/72; 62/544; 165/84; 210/748; 210/769; 210/774
[58] Field of Search .............. 210/19, 354, 355, 356, 210/176, 321, 220, 72, 83; 23/273 R, 273 F, 273; 159/DIG. 19; 165/84; 62/70, 72, 538, 406

[56] References Cited

U.S. PATENT DOCUMENTS

| 1,508,177 | 9/1924 | Frazier | 210/220 |
| 1,983,805 | 12/1934 | Munson et al. | 23/273 X |
| 2,686,712 | 8/1954 | Estes | 23/273 R |
| 3,224,843 | 12/1965 | Morgan et al. | 23/273 R |
| 3,380,513 | 4/1968 | Staats, Jr. | 23/273 R |
| 3,389,997 | 6/1968 | Allen | 210/19 X |

FOREIGN PATENT DOCUMENTS 606028 11/1934 Fed. Rep. of Germany ............ 165/84

*Primary Examiner*—Frank A. Spear, Jr.

[57] ABSTRACT

Process is provided for the creation of crystal aggregates in one part of a tank by heat transfer from a fluid disposed in another part of the tank and maintained by heating or by cooling at a different temperature than the part containing the crystal aggregates. Both of these parts are separated from each other by a flexible membrane which is pulsated by dynamic local pressure differentials caused by foaming or by fluidizing the heat transfer fluid.

3 Claims, 5 Drawing Figures

PROCESS FOR SEGREGATING SOLID SUBSTANCES FROM A LIQUID PHASE

The subject matter of the invention is a process and equipment for segregating solid substances from a liquid phase by heat transfer.

BACKGROUND

The essence of working principles of equipment serving for segregation of solid substances is known per se and involves heat transfer. The greatest problem being, as is well known, that the solid substance forming on the heat transmitting surface, leaves it partly only, and the remaining part adheres on the surface. Depositions in equipment working on a higher than freezing point temperature, e.g. in crystallizing equipment for solid matter, and in equipment working on a lower than the freezing point temperature, e.g. in equipment operating by freezing, ice formation, significantly hinder the heat transfer, and in extreme cases may also necessitate stopping of working.

In hindering heat transfer by depositions, it is characteristic that while the heat conduction coefficient is for copper 320, for aluminum 200, for steel 15 to 50, in case of boiler scale deposited on the walls the coefficient is 0.1 to 2.0, for ice 1.5 to 2.0 and for various gels and salts 0.3 to 0.5 kcal./m$^2$.h.°C. (See: VDI Warmeatlas continuous edition).

Taking into account that the thickness of the layer covering the wall is of the same order of magnitude as the wall thickness, or even greater, the harmful effect of the layer on heat transfer, and consequently the difficulty of continuous working caused by deposits, would be obvious.

Processes known so far try to prevent deposits by increasing the circulating speed of the solution, by diminishing the temperature difference between cooled and cooling media, or by using mechanical scraping devices. For example, the known "Oslo" or "Krystal" type crystallizers work with 1 to 2 m./s. flowing speed and max. 2° C. temperature difference in the cooling pipes for 120 to 150 hours without cleaning. Although the heat transfer coefficient may reach 800 kcal./m.$^2$.h.°C. value, because of the low temperature difference, however, rather large surfaces are needed for cooling. For example, characteristics of the equipment may be: the heat (product of the heat transfer coefficient and of the temperature difference) transferred in one hour on a surface of 1 m.$^2$ maximally can be at least 1 600 kcal.

Crystallizers with mechanical scrapers (Swanson-Water), crystallizers with double pipe, worm crystallizers, may work also for a longer time without cleaning, their heat transfer coefficient is however, at least 100 kcal./m$^2$h°C. For these there is no significant requirement relating to the temperature difference, so e.g. with 20° C. temperature difference on 1 m$^2$ surface in an hour 2,000 kcal. can be transferred.

In these processes measures are taken for preventing deposits by high circulating relations (1:50 to 1:250), by driving the scraping mechanism, but due to the high hydraulic resistance (30 to 40 atm.) and high energy requirement, they are expensive to operate, so that no complete solution is achieved, because the equipment has to be cleaned too often.

A newer process, achieved by the crystallization equipment of J. Cerny operates with direct heat transfer, realized by a fluid not mixing with the crystallizing solution, eliminating by this the use of a rigid heat transfer surface. With its application, however, formation of inclusions and contamination of the crystallized product or of the solution, occurs, therefore it can be used but in a confined region only.

SUMMARY OF THE INVENTION

The aim of our invention has been the development of a process for segregating solid substances (crystals or deposits) by action of heat, where segregation is effected by heat on the surface of heat transfer, but without forming on it solid coating, so that the continually segregating solid substance should continually be withdrawn (pulled away) from the heat transferring surface, to ensure the continuity of segregation.

The invention is based on the recognition, that on the rear side of a membrane confined by a foamed heat transmitting liquid or fluidized layer, the solid substance that is separating out, surprisingly does not adhere to the membrane surface. Segregation of the solid substance might be either periodical or continuous. Therefore by using for a heat transmitting partition wall a thin membrane, and when of the two liquids on both sides of the partition wall, at least one will be foamed, then the transfer of heat and of pulses will become very intensive, and this intensive pulse transfer prevents formation of deposits by vibrating the membrane.

On a partition wall acting as a membrane, as used in the present description as well as in the claims, a thin, porosity free elastic heat transferring plate is understood, the material of which may be a foil of metal or plastic. By using a metal foil the result is obvious, but also a plastic foil has considerable advantages, because the extremely small thickness of the foil, being by two or three orders of magnitude less than the traditional, ameliorates heat transfer also so that its heat conductivity is much less than that of metals.

The essence of the process according to the invention is therefore that the space filled with a fluid containing the substance to be segregated, is separated from the neighbouring space containing the heat transmitting fluid by a membrane, while at least one of the filling media is maintained by cooling or by heating on a temperature deviating from the other, and one or both of the replenishing fluids in the spaces filled with liquids are foamed or fluidized by gas introduction, while in the other space the solid substance is segregated by heat transfer from the first space.

For achieving the result, foaming or fluidization becomes necessary on the cooled or heated side only, while in the space of solid substance segregation this is not compulsory. When nevertheless fluidization or foaming is applied, its aim is to smash up crystals.

For segregation of solid substances cooling is applied on the heat transferring side. For dissolving small crystals a small amount of heating could be carried out on the side of segregating solid substances, but otherwise in addition to the thin partition wall no heat transfer (heat dissipation) is required. The heating or cooling media, however, are expediently led through a closed up vessel system, arranged in spaces confined by the membrane, by filling the space with a foamed heat transmitting fluid.

The essence of the equipment according to the invention consists of having spaces separated by an elastic membrane and in these or in one of these having means for gas introduction. In the spaces or in one of these, devices, serviceably a conduit system serving for streaming the cooling or heating media might be placed.

In the course of experiments carried out with a crystallizing equipment having membrane partition walls, depending on gas velocity, heat transfer coefficients of 300 to 800 kcal./m.$^2$h.°C. were measured. Since there are no limitations for temperature differences, with an average heat transfer coefficient (500 kca./m.$^2$h.°C.) and 20° C. temperature difference, on 1 m.$^2$ heat transmitting surface of the equipment, in 1 hour a heat quantity of 10,000 kcal. may be transferred. This process is also significantly more favorable with regard to energy consumption than former processes; it does not need any circulation of the solution, it has practically no hydraulic resistance, it does not need any mechanically driven scraper, and the energy requirement for maintaining the foam phase is negligible.

BRIEF DESCRIPTION OF THE DRAWING

The process according to the invention will be described hereinafter in detail with reference to the operation of an embodiment given by way of examples of the equipment.

FIG. 4 is represented in the vertical section and FIG. 5 in a horizontal section of this embodiment.

DETAILED DESCRIPTION

Figure 1:
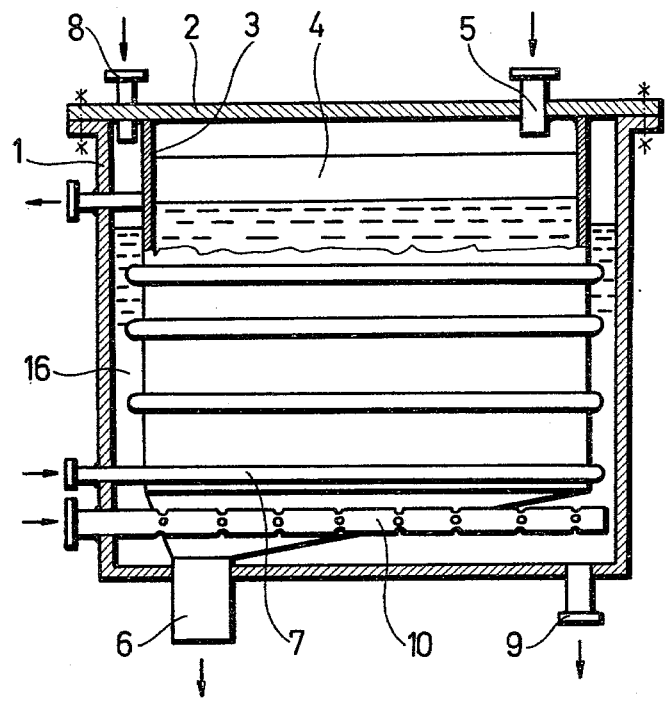
FIG. 1 shows the vertical longitudinal section of the equipment.
Figure 2:
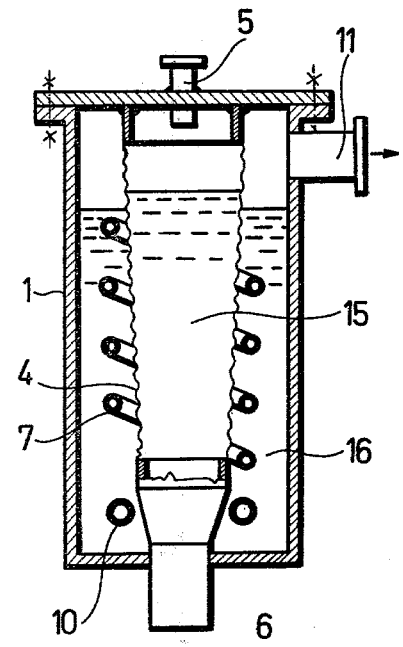
FIG. 2 the vertical cross section of the equipment.
Figure 3:
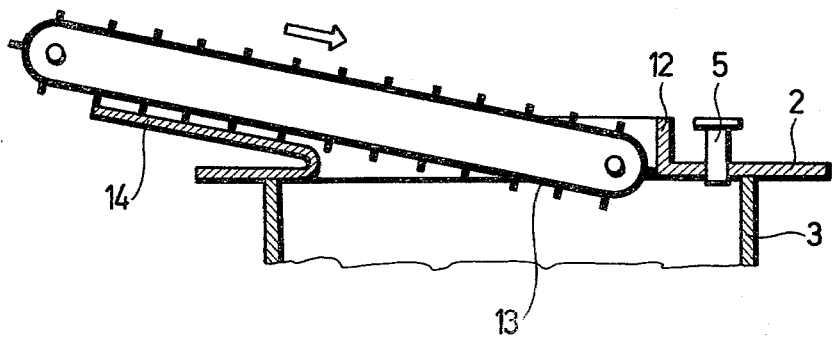
FIG. 3 the vertical section of a special embodiment of the equipment's cover.
Figure 4:
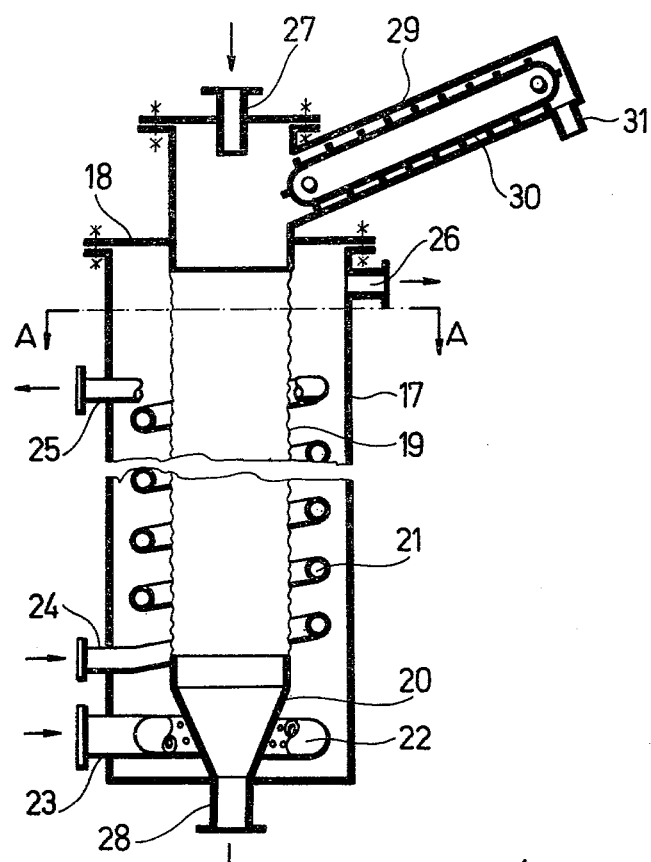
FIGS. 4 and 5 show another embodiment of the invention whereby
Figure 5:
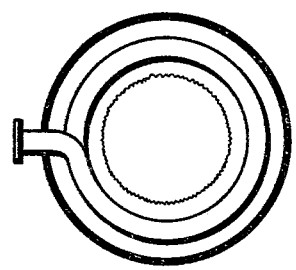

In the equipment according to FIGS. 1 to 3 the membrane is placed on both sides of the frame, while on the equipment according to FIGS. 4 to 5 a circular shaped membrane is shown. The vibrations arising on the membrane are different in the two embodiments.

The equipment according to FIGS. 1 to 3 is preferred for continuous operation, while the equipment according to FIGS. 4 and 5, with hanged in circular shaped membrane is more suited for periodical operation.

A cover 2 is secured by screws to the parallelepiped shaped body 1 of the apparatus, which is joined to a frame. A membrane wall 4 is fixed to the frame 3, the material of which may be, depending on working temperature, a 0.1 to 0.085 mm. thick aluminium, stainless steel, silicon rubber, polyethylene, etc. foil. The frame 3 and the membrane wall 4 divide the space limited by the internal surface of the equipment into two liquid tight parts. A space 15 confined by the internal surface of the frame 3 and the membrane wall 4, is filled in case of crystallization by a solution of the product saturated at room temperature.

Into a space 16 confined by the internal surface of the equipment the body 1 and the frame 3 and by the external surface of the membrane 4, a cooling liquid is poured, is foamed by air, introduced through air distributor 10 (or by a gas recirculated in a closed cycle). A stud 5 serves to introduce the liquid stream to be cooled, a stud 6 for draining off the crystallized product and the mother lye and a stud 8 is provided for introducing the foamed cooling agent and a stud 9 for exhausting it, while foaming air (or gas) leaves through a stud 11, as shown on FIG. 2.

When the equipment is used for concentration by freezing, then a brine (e.g. a CaCl$_2$ solution) is employed. The liquid to be concentrated is led continually through the stud 5 into the equipment, while the concentrate is carried away through a stud 6. The necessary cooling calories are secured by connecting a pipe coil 7 into the cooling circuit of a refrigerator. Equipment cover 12 is formed in a way, as it may be seen on FIG. 3., for fit to a scraper 13 and a chute 14.

The advantages of employing the equipment might be summarized as follows:

Thermal resistance of the very thin membrane wall is even then very low, when it does not consist of a metal;

The membrane wall prevents mixing of cooling and cooled liquids, and at the same time it hinders but little heat pulse transmission;

On the wall no deposition can be formed, because this is smashed after reaching a very small thickness on action of pulses received from the foamed cooling agent;

The liquid stream to be cooled, due to the very intensive pulse transmission should not be agitated in all cases;

Due to foaming, the membrane wall performs vibrations according to statistical distribution, therefore standing waves occur.

Experiments were carried out for crystallization of NiSO$_4$, as well as for concentration by freezing of fruit juice, sugar solution, wine, milk and NaCl solution, and it has been found that the equipment proved out well in the aforementioned cases, depositions were in no case experienced on the cooling surface.

Another example of equipment is shown on FIGS. 4 and 5., the operation of which is as follows:

A cover 18 is jointed to the equipment body 17 by screws, and to the lower cylindrical part a cylindrical plastic (e.g. polyethylene) foil 19 is connected, the lower edge of which is fixed to the conical leading out stud 20. The plastic hose 19, the thickness of which is suitably between 25 and 100 microns, is surrounded concentrically by a cooling tube 21. A gas distributing ring 22 arranged in the lower third of the equipment, is to be connected by means of a stud 23 to the conduit supplying compressed air.

The space between the plastic hose 19 and the equipment body 17 is filled with a heat conveying liquid—e.g. by CaCl$_2$ solution—while into the interior of the hose the solution to be concentrated is poured in. By studs 24 and 25 the cooling pipe 21 is inserted into the cooling circuit of the refrigerator.

A stud 27 serves for continuous leading in of the solution to be concentrated and a stud 28 for draining it off.

Through an air distributing ring 22 air is introduced into the equipment, on the action of which the CaCl$_2$ solution begins intensively to foam and transmits pulses through the hose wall, exerting a very small mechanical resistance to the liquid to be concentrated, thus also coming into intensive motion.

Due to cooling the bordering layer freezes on the internal wall of the foil, but is smashed because of the intensive motion of the foil, the layer separates from the wall, and comes to float in form of ice on the surface of the liquid to be concentrated, from where a scraper 30 placed in a housing 29 drains it off through a stud 31 from the system.

Naturally executions deviating from the above examples may also be made without impairing the essence of the invention.

What we claim is:

1. A process for segregating solid substances by heat transfer from a liquid phase, which comprises separating the space containing the substance to be segregated by a thin elastic membrane from the space containing a heat transfer liquid, maintaining the contents of one of the spaces by heating or cooling at a temperature different from the temperature of the contents of the other of said spaces, foaming or fluidizing the heat transfer liquid by injecting a gas into the lower portion thereof, whereby dynamic local pressure variations are created by the rising gas bubbles causing a pulsing of the membrane, and separation therefrom of the solid substance aggregates adhering thereto.

2. The process of claim 1, further comprising foaming or fluidizing the contents of the space containing the substance to be segregated by injecting a gas into the lower portion of said contents.

3. The process of claim 1, further comprising heating the contents of the space containing the substance to be segregated.

* * * * *